G. E. FERGUSON.
CHEMICAL HEATER.
APPLICATION FILED JULY 10, 1917.

1,385,074.

Patented July 19, 1921.

INVENTOR
George E. Ferguson
BY
Lewis J. Doolittle
ATTORNEY

UNITED STATES PATENT OFFICE.

GEORGE E. FERGUSON, OF NEW YORK, N. Y., ASSIGNOR TO PYRENE MANUFACTURING COMPANY, A CORPORATION OF DELAWARE.

CHEMICAL HEATER.

1,385,074.     Specification of Letters Patent.     Patented July 19, 1921.

Application filed July 10, 1917. Serial No. 179,670.

*To all whom it may concern:*

Be it known that I, GEORGE E. FERGUSON, a citizen of the United States, and resident of the city, county, and State of New York, have invented certain new and useful Improvements in Chemical Heaters, of which the following is a specification.

This invention relates to chemical heaters and more particularly to one adapted to produce heat by the crystallization of salts containing water of crystallization, or such salts dissolved in their own water of crystallization (from which condition crystallizing occurs).

When salts of this kind crystallize, subsequent to being dissolved in their own water of crystallization, heat is produced by such crystallization, as is well known.

While efforts have been made to construct heaters making use of such crystallizable salts no heater has been devised which would permit of the salts, after first being melted to dissolve them in their water of crystallization by the application of heat, being retained in such melted, or liquid condition until the production of heat is desired.

A solution of a crystallizable salt dissolved in its own water of crystallization, or, in other words, a melted mass of crystals, is in a very unstable condition when the solution cools and is subject to an impulse, which has hitherto been found to be practically unpreventable, and resolves itself into crystal formation, such crystallization being brought about by the action of any outside influence on the liquid mass, such as a shock to the container, a supercooling of the liquid mass, the introduction of solid particles of foreign matter, along contact with the air, or the introduction of one or more crystals of the same composition as that of the liquid mass. Heaters making use of crystallizable salts were only reliable, therefore, for use immediately after heat was applied thereto to melt the salts.

The most serious difficulty, as far as the retaining of the salts in such melted condition was concerned, lay in the fact that a jarring or abrupt movement of the container containing the melted salts produced crystallization of the latter and no means or method was known by which crystallizing of the liquid mass during ordinary handling of the container could be prevented.

Furthermore, as far as any practical use in a heater of this kind was concerned, any means which might be discovered for holding such salts in melted condition would have to be of a nature which allowed of the salts being caused to crystallize at any desired time and then subsequently being again melted and held in such melted condition and the operation repeated as desired.

After considerable experiment and observation I discovered that if the liquid mass was inclosed in a container in a manner which would exclude air therefrom and prevent movement of the liquid mass as a whole in the container and prevent any impact or blow between any portion of the liquid and the surrounding surfaces of the container, the latter might be subjected to any handling, jolting or jarring, or the liquid mass remain for an indefinite length of time in such container, or be supercooled below room temperature, without any danger of crystallization.

In effecting this sealing there were certain conditions, the consideration of which was essential. Since a disturbance of the liquid mass after the cooling would result in crystallization, it was very desirable that the mass be sealed while in a heated condition and that the seal would still remain good after subsequent shrinkage of the liquid mass which occurs upon cooling.

Since the use of any mechanical sealing device, even were one worked out to fulfil all the above conditions, would add to the manufacturing cost, such devices were eliminated from consideration. Attention was directed to the use of organic sealing materials which would be solid at normal temperatures and which would melt easily and be easily ruptured.

Experiments were made with the various commercial waxes as a sealing medium for the mouth of the container but it was found that they could not be relied upon to fulfil the above conditions. For the heater to be of practical use it was desirable that the seal should be automatically reapplied by the simple heating of the container to melt the crystals, after any previous use of the heater.

Experiments with paraffin wax, both hard, medium and soft, were first made. Then all the other known commercial waxes and then combinations of these waxes, were tried. These experiments were tried under the conditions in which the heater would actually have to be used, that is to say, the wax and crystallizable material were heated together in a suitable container. These waxes fulfilled certain of the conditions in that they were of less specific gravity than the melted mass of crystals and were insoluble therein and would, therefore, always float on top of the latter, but there were other conditions which they did not satisfactorily meet. During cooling of the liquid mass a certain amount of shrinkage thereof occurs and it was found that these waxes or combination of waxes could not be relied upon with certainty to adhere with requisite firmness to the sides of the container mouth or neck while at the same time possessing sufficient elasticity or pliability to follow the liquid mass closely as it shrinks while cooling.

Moreover these waxes themselves contract while cooling (and since cooling naturally takes place from the exterior of any mass toward the center) the shrinking of the wax as it solidified with comparative quickness along the surfaces thereof in contact with the walls of the container tended to produce minute indentations or scorings in the surface of the wax which left spaces therebetween and the container walls, which spaces were liable to form a connected passage leading, between the container walls and wax seal, from the exterior thereof to the liquid mass.

Finally a mixture of paraffin wax and lanolin was obtained which fulfilled the required conditions, adhering closely to the walls of the container as the liquid crystal mass cools, having substantially the same melting points as the crystals and also cooling at about the same rate of speed as the latter, while it does not shrink upon cooling.

Various crystallizable salts may, of course, be employed as desired in the heater, my invention not being limited in its application to any specific salts or combination of salts. I have found that a combination of four parts of sodium acetate with three molecules of water of crystallization and one part of sodium thiosulfate with five molecules of water of crystallization was satisfactory for use in a chemical heater.

I found also that the construction of the container had, in one respect, a bearing on the preventing of crystallization. It was found desirable that the walls of the container be sufficiently rigid to withstand all ordinary shocks or jars or blows, to which it might be subjected in use, without any buckling, bending or indentation thereof.

In the accompanying drawings, I have illustrated my invention applied to a heater adapted more particularly for use in place of the well known "hot water bag" to apply external heat to a desired portion of the body of the user, the container as here shown being of flattened circular shape, but any desired departure from the shape and construction here shown may be followed.

Figure 1 of the drawings is a sectional face view of the heater to which the invention is here shown as applied, this view being taken on the line 1—1 of Fig. 2.

Figure 1:
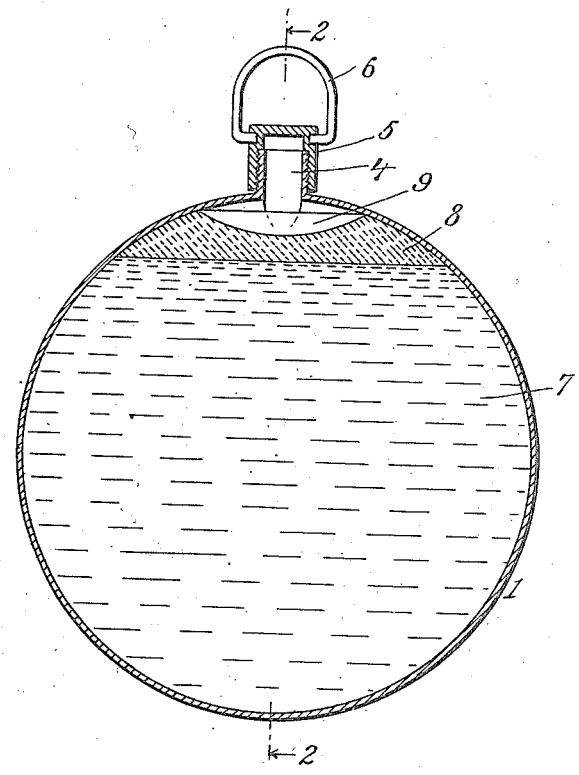
Figure 2:
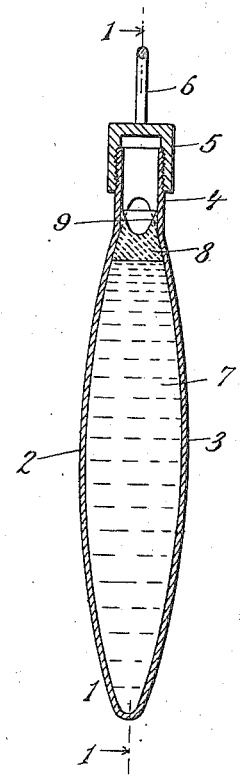
Fig. 2 is a transverse section on the line 2—2 of Fig. 1.
Figure 3:
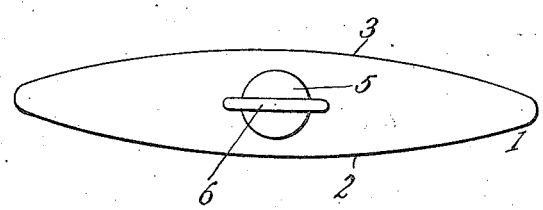
Fig. 3 is a plan view of the heater.

The container as shown comprises a body 1 of flattened circular form which may have its opposite walls 2 and 3 slightly flared outwardly from one another, as shown in Figs. 2 and 3, to increase the rigidity thereof. Formed integrally with this body is a neck 4 upon which is screwed a cap 5 on which is hinged a ring 6. The melted mass of crystals is indicated at 7 as nearly filling the body of the container, while the sealing material is in the form of a plug 8 above the melted mass and adjacent the neck 4.

In the original preparation of the heater the crystallizable material and the sealing material may be introduced in any form into the container. The container may be filled to the desired point with the uncrystallized salt or salts while a sealing material such as paraffin wax and lanolin may be introduced together or separately.

Upon heat being applied to the container, which may conveniently be done by immersing the latter in boiling water, both the salts and the sealing material are melted. The sealing material, because of its being of less specific gravity, remains or floats upon the top of the melted crystals and, upon the container being left to cool in an upright position, the sealing material solidifies and forms a seal over the liquid mass which effectually holds the liquid against agitation or relative movement and prevents crystallization thereof. A central depression or concavity 9 is formed in the top of the plug 8 during cooling by reason of the shrinking of the crystal mass 7 and of the constant adhesion between the contacting surfaces of the plug and container, the sealing material being forced downwardly in the center and then outwardly against the sides of the container. A sufficient amount of sealing material will be employed to form a plug of the requisite strength to hold the liquid and withstand shocks when the container is in inverted position.

The salts and sealing material can be melted separately and introduced in melted form into the container or other methods employed for assembling the salts and sealing material in the container, as desired.

When it is desired to cause the production of heat, it is only necessary to unscrew the cap 5 and pierce the plug 8 with any sharp or pointed instrument, or otherwise break the seal, when the introduction of the piercing instrument, causing a disturbance or impact between the particles of the liquid, and the admission of air to the liquid will cause crystallization with a resultant production of heat, or if crystallization is slow in starting it can be hastened by shaking the container after the piercing of the plug or seal.

The heater is again put in condition for future service by reheating (by immersion in hot water or otherwise) to melt the crystals and sealing material, and then allowing it to remain undisturbed till the melted crystals cool and the plug 8 solidifies, the ring 6 furnishing a convenient means for suspending the heater in upright position until the plug solidifies.

With the melted mass of crystals sealed in the container as above described, the mass is entirely excluded from the atmosphere, while any agitation or relative movement and friction between the various particles thereof, or between the liquid mass of melted crystals and the walls of the container, is prevented. This effectually prevents the crystallization of the liquid regardless of the handling of the container until it is desired to start the action again as above described.

It will thus be seen that a practical chemical heater is provided which is simple in construction and operation and capable of reuse as may be desired.

What I claim is:

1. In a device of the class described, in combination with a container, a solution of a crystallizable salt and a sealing means in said container, said sealing means being of a lesser specific gravity than the salt solution and adapted to be melted upon application of heat thereto and float upon the surface of said salt solution and, upon cooling, to solidify and adhere to the walls of the container and in engagement with the surface of said salt solution, preventing relative movement and crystallization thereof regardless of the position of the container.

2. In a device of the class described, in combination with a container, a solution of a crystallizable salt and a sealing means in said container, said sealing means having substantially the same melting point as that of the salt solution but of less specific gravity and adapted to be melted upon application of heat thereto but adapted to solidify when cooled and hold said salt solution against agitation and prevent crystallization thereof regardless of the position of the container.

3. In a device of the class described, in combination with a container, a solution of a crystallizable salt and a sealing means in said container, said sealing means being of less specific gravity than the salt solution and of organic material which may be melted upon application of heat thereto but is solid at normal temperature and adapted to hold the salt solution against agitation and prevent crystallization thereof regardless of the position of the container.

4. In a device of the class described, in combination with a container, a heating composition and a sealing composition in said container, both of said compositions being adapted to be reduced to a fluid condition upon the application of heat thereto, said sealing composition being of a less specific gravity than the heating composition.

5. In a device of the class described, in combination with a container, a heating composition containing a solution of sodium acetate and sodium thiosulfate with water of crystallization, and a sealing composition, both of said compositions being adapted to be reduced to a fluid condition upon application of heat thereto, said sealing composition being of a less specific gravity than the heating composition and adapted to hold said heating composition against agitation and preventing crystallization thereof regardless of the position of the container.

6. In a device of the class described, in combination with a container, a solution of a crystallizable salt, and a seal containing wax and lanolin, both of said compositions being adapted to be reduced to a fluid condition upon application of heat thereto, said sealing composition being of a less specific gravity than the heating composition and adapted to hold the salt solution against agitation and preventing crystallization thereof regardless of the position of the container.

7. In a device of the class described, in combination with a container, a solution of sodium acetate and sodium thiosulfate dissolved in their water of crystallization and held against agitation in the container by a seal composed of wax and lanolin, both of said compositions being adapted to be reduced to a fluid condition upon application of heat thereto, said sealing composition being of a less specific gravity than the heating composition.

Signed at the city, county and State of New York, this 9th day of July, 1917.

GEORGE E. FERGUSON.

Witnesses:
ANNA E. FERGUSON,
LENS E. ECHELMANN.